(12) United States Patent
Leonard et al.

(10) Patent No.: US 7,188,120 B1
(45) Date of Patent: Mar. 6, 2007

(54) SYSTEM STATISTICS VIRTUALIZATION FOR OPERATING SYSTEMS PARTITIONS

(75) Inventors: Ozgur C. Leonard, San Mateo, CA (US); Andrew G. Tucker, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 471 days.

(21) Appl. No.: 10/762,066

(22) Filed: Jan. 20, 2004

Related U.S. Application Data

(60) Provisional application No. 60/469,558, filed on May 9, 2003.

(51) Int. Cl.
G06F 17/30 (2006.01)
(52) U.S. Cl. ...................................... 707/102
(58) Field of Classification Search .................... 707/1, 707/2, 10, 200, 102; 709/100
See application file for complete search history.

(56) References Cited

U.S. PATENT DOCUMENTS

| | | | |
|---|---|---|---|
| 5,325,526 A | 6/1994 | Cameron et al. | |
| 5,437,032 A | 7/1995 | Wolf et al. | |
| 5,845,116 A | 12/1998 | Saito et al. | |
| 6,074,427 A | 6/2000 | Fought et al. | |
| 2002/0120660 A1* | 8/2002 | Hay et al. | 709/100 |
| 2002/0156824 A1 | 10/2002 | Armstrong et al. | |
| 2002/0161817 A1 | 10/2002 | Dorofeev et al. | |

FOREIGN PATENT DOCUMENTS

| | | |
|---|---|---|
| EP | 1043658 A1 | 10/2000 |
| EP | 1228038 A2 | 2/2003 |
| EP | 1300766 A | 4/2003 |

OTHER PUBLICATIONS

Official Action from EPO for foreign patent application No. 04 252 690.5—2211 dated Nov. 23, 2005 (5 pgs)—attached.
Current Claims in EPO patent application No. 04 252 690.5—2211 (9 pgs)—attached.
European Patent Office, "European Search Report," application No. 04252689.7, mailed date Jul. 28, 2005, 3 pages.

(Continued)

Primary Examiner—Etienne P LeRoux
(74) Attorney, Agent, or Firm—Christian A. Nicholes; Hickman Palermo Truong & Becker LLP (57) ABSTRACT

A mechanism is disclosed for virtualizing system statistics in an operating system environment (OSE) that has been partitioned into a global zone and one or more non-global zones. The OSE comprises processes and system resources. Each process is associated with a zone. Each resource may be associated with a statistical data structure. Statistical data about a resource is stored in that resource's statistical data structure. Each statistical data structure is associated with at least one zone and one or more key values. A process may specify key values. The kernel may select a set of statistical data structures that are associated with the process' associated zone. The kernel may return, to the process, a list of statistical data structures in the set, or statistical data contained in one of the set's statistical data structures that matches the process-specified key values.

27 Claims, 6 Drawing Sheets

OTHER PUBLICATIONS

Current Claims, European patent application 04252689.7, 6 pages.

Sun Microsystems, "Sun Enterprise™ 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.

Official Action from EPO for foreign patent application No. 04 252 690.5—2211 dated Jun. 10, 2005 (6 pgs)—attached.

Current Claims in EPO patent application No. 04 252 690.5—2211 (9 pgs)—attached.

European Search Report from the European Patent Office for Foreign Patent Application No. 04252690.5 (3 pgs.).

Claims As Filed in European Patent Application No. 04252690.5 (6 pgs.).

Poul-Henning Kamp, et al., "Jails: Confining the omnipotent root", 2nd Intl System Administration and Networking Conference Proceedings "SANE 2000", May 22-25, 2000, Maastricht, The Netherlands, pp. 1-11.

Communication from the ACM (ISSN: 0001-0782) vol. 44, Issue 2 (2001) entitled "An Operating System Approach to Securing E-Services" by Chris Dalton and Tse Huong Choo, ACM Copyright Notice, © 2001, (8 pgs).

Sun Microsystems, Inc. entitled Server Virtualization with Trusted Solaris™ 8 Operating Environment, by Glenn Faden, Sun BluePrints™ OnLine—Feb. 2002, http://www.sun.com/blueprints, (21 pgs).

Network Working Group entitled "IP Version 6 Addressing Architecture", by R. hinden, Nokia, S. Deering, Cisco System, dtd Jul. 1998, (28 pgs).

IBM entitled Partitioning for the IBM eserver pSeries 690 System, © Copyright IBM Corp. 2001 (12 pgs).

IBM System Partitioning on IBM eserver xSeries Serves entitled "Effective Server Consolidation and Resource Management with System Partitioning" by Mark T. Chapman, IBM Server Group, dtd Dec. 2001, (23 pgs).

Virtual Private Servers and Security Contexts, dtd May 10, 2004, http://www.solucorp.qc.ca/miscprj/s_content.hc?pristate=1&nodoc=0, (2 pgs).

SunSoft, a Sun Microsystems, Inc. Business entitled "File System Administration", © 1994 Sun Microsystem, Inc., (62 pgs).

\* cited by examiner

SYSTEM STATISTICS VIRTUALIZATION FOR OPERATING SYSTEMS PARTITIONS

CLAIM OF PRIORITY

This application claims priority to U.S. Provisional Application Ser. No. 60/469,558, filed May 9, 2003, entitled "OPERATING SYSTEM VIRTUALIZATION," by Andrew G. Tueker, et al., the entire contents of which are incorporated by reference as if fully set forth herein.

BACKGROUND

Many of today's computing systems include computing resources that are not fully utilized. The owners of these systems often could benefit by increasing the utilization of these systems' computing resources.

A number of approaches could be adopted in order to increase utilization. Under a "consolidation" approach, the processes and data of multiple parties might be co-located on a single hardware unit in order to more fully utilize the resources of the hardware unit. Under the consolidation approach, multiple parties might share a single hardware unit's resources, including file systems, network connections, and memory structures. For example, multiple businesses might have separate websites that are hosted by the same server.

However, some of the parties might not know or trust each other. In some cases, some of the parties actually might be competitors with others of the parties. Under such circumstances, each party would want to ensure that its processes and data were shielded, or isolated, from access by other parties and those other parties' processes.

Mechanisms that would isolate one party's processes and data from other parties sharing the same hardware unit have been proposed. For example, a "jail" mechanism provides the ability to partition an operating system environment ("OSE") into a "non-jailed" environment and one or more "jailed" environments. The jail mechanism allows users, processes, and data to be associated with a jailed environment. For example, one group of users, processes, and data may be associated with one jailed environment, and another group of users, processes, and data may be associated with another jailed environment. The jail mechanism restricts users and processes that are associated with a particular jailed environment from accessing processes and data that are associated with environments (both jailed and non-jailed) other than the particular jailed environment.

Some OSEs provide a statistics recording mechanism that records statistics that pertain to one or more resources that are defined within the OSE. For example, the resources defined within an OSE might include one or more separate Network File System ("NFS") mounts. Each NFS mount might be associated with a separate statistical data structure. When data is written to a particular NFS mount, the statistics recording mechanism might update, for example, information in the particular NFS mount's associated statistical data structure. The information might include, for example, an indication of the quantity of data that has been written to the particular NFS mount.

As discussed above, an OSE may be partitioned into a non-jailed environment and one or more jailed environments. However, no previous statistics recording approaches contemplated multiple partitions within an OSE. Because previous statistics recording approaches did not contemplate a partitioned OSE, previous statistics recording approaches do not account for certain security and scope issues that do not arise in non-partitioned OSEs.

SUMMARY

In accordance with one embodiment of the present invention, a mechanism is disclosed for virtualizing system statistics in an OSE that has been partitioned into a global zone and one or more non-global zones. The OSE comprises one or more processes and one or more system resources. Each process is associated with a zone in which that process executes. Each system resource may be associated with a statistical data structure. Statistical data about a resource is stored in that resource's associated statistical data structure. Each statistical data structure is associated with at least one zone and one or more key values.

According to one aspect, a process may specify one or more key values. The kernel responsively selects, from among a plurality of statistical data structures, a set of statistical data structures that are associated with the specified key values. The kernel determines whether any statistical data structure in the set is associated with the zone in which the process executes. If a statistical data structure in the set is associated with the zone in which the process executes, then the kernel sends, to the process, statistical data that is stored in that statistical data structure.

According to one aspect, a process may request a list of statistical data structures. The kernel responsively selects, from among a plurality of statistical data structures, a set of statistical data structures that are associated with the zone in which the process executes. The kernel sends, to the process, a list of the statistical data structures in the set. The set does not contain any statistical data structures that are not associated with the zone in which the process executes.

DETAILED DESCRIPTION OF EMBODIMENT(S)

Overview

Figure 1:
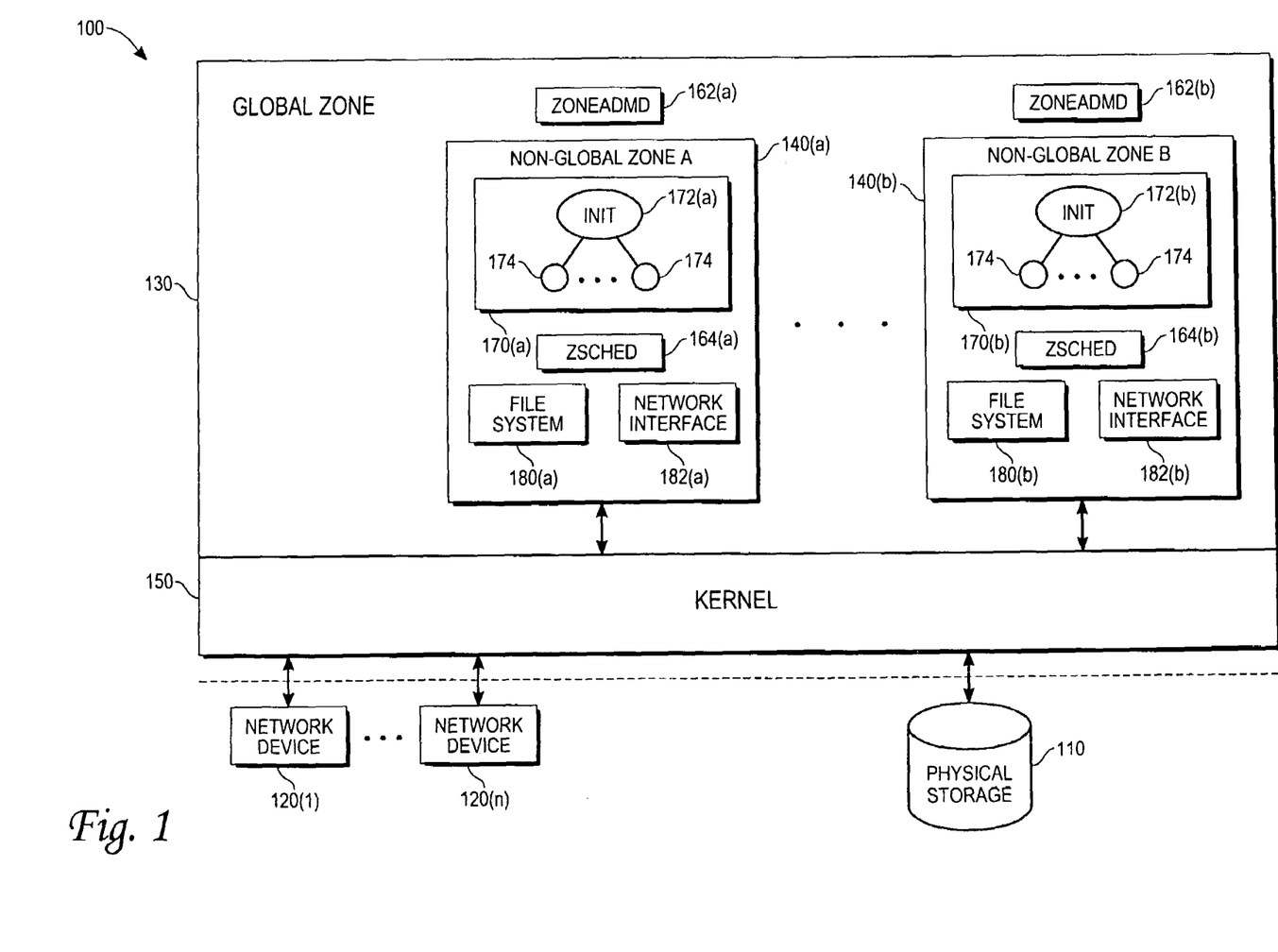
FIG. 1 is a functional block diagram of a representative OSE for a computing system in which one embodiment of the present invention may be implemented.
Figure 4:
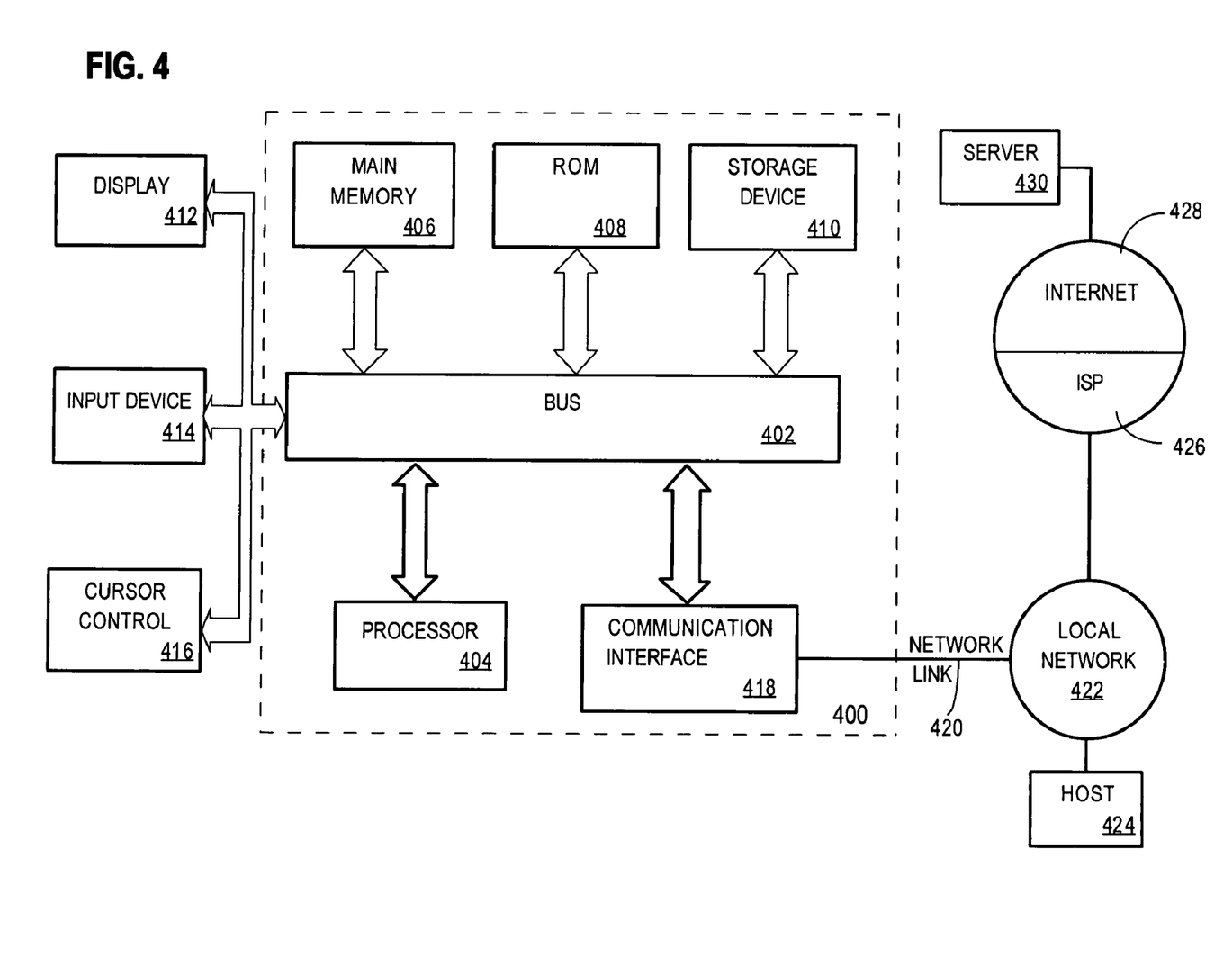
FIG. 4 is a hardware block diagram of a sample computer system, upon which one or more components of an embodiment of the present invention may be implemented.

FIG. 1 illustrates a functional block diagram of an OSE 100 in accordance with one embodiment of the present invention. OSE 100 may be derived by executing an operating system (OS) in a general-purpose computer system, such as computer system 400 illustrated in FIG. 4, for example. Although FIG. 4 depicts a system that contains centralized component resources, embodiments may be implemented on systems that comprise remotely distributed component resources (e.g., processors, memory, persistent storage, etc.) that access each other via a network. For illustrative purposes, the OS is assumed to be Solaris™ manufactured by Sun Microsystems, Inc. of Santa Clara, Calif. However, the concepts taught herein may be applied to any OS, including but not limited to Unix, Linux, Microsoft Windows, MacOS, etc.

As shown in FIG. 1, OSE 100 may comprise one or more zones (also referred to herein as partitions), including a global zone 130 and zero or more non-global zones 140. The global zone 130 is the general OSE that is created when the OS is booted and executed, and serves as the default zone in which processes may be executed if no non-global zones 140 are created. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140.

The non-global zones 140 represent separate and distinct partitions of the OSE 100. Each of non-global zones 140 may be viewed as a virtual operating system environment ("VOSE"). One of the purposes of the non-global zones 140 is to provide isolation. In one embodiment, a non-global zone 140 can be used to isolate a number of entities, including but not limited to processes 170, one or more file systems 180, and one or more logical network interfaces 182. Because of this isolation, processes 170 executing in one non-global zone 140 cannot access or affect processes in any other zone. Similarly, processes 170 in a non-global zone 140 cannot access or affect the file system 180 of another zone, nor can they access or affect the network interface 182 of another zone. As a result, the processes 170 in a non-global zone 140 are limited to accessing and affecting the processes and entities in that zone. Isolated in this manner, each non-global zone 140 behaves like a virtual standalone computer. While processes 170 in different non-global zones 140 cannot access or affect each other, it should be noted that they may be able to communicate with each other via a network connection through their respective logical network interfaces 182. This is similar to how processes on separate standalone computers communicate with each other.

Having non-global zones 140 that are isolated from each other may be desirable in many applications. For example, if a single computer system running a single instance of an OS is to be used to host applications for different competitors (e.g., competing websites), then it would be desirable to isolate the data and processes of one competitor from the data and processes of another competitor. That way, it can be ensured that information will not be leaked between the competitors. Partitioning an OSE 100 into non-global zones 140 is one possible way of achieving this isolation. Competing applications (e.g., websites) may then be hosted in separate non-global zones 140.

In one embodiment, each non-global zone 140 may be administered separately. More specifically, it is possible to assign a zone administrator to a particular non-global zone 140 and grant that zone administrator rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. Thus, in the above example, each competitor can administer his/her zone, and hence, his/her own set of applications, but cannot change or affect the applications of a competitor. In one embodiment, to prevent a non-global zone 140 from affecting other zones, the entities in a non-global zone 140 generally are not allowed to access or control any of the physical devices of the computer system.

In contrast to a non-global zone administrator, a global zone administrator with proper rights and privileges may administer all aspects of the OSE 100 and the computer system as a whole. Thus, a global zone administrator may, for example, access and control physical devices, allocate and control system resources, establish operational parameters, etc. A global zone administrator may also access and control processes and entities within a non-global zone 140.

In one embodiment, kernel 150 enforces the zone boundaries. More specifically, kernel 150 ensures that processes 170 in one non-global zone 140 are not able to access or affect processes 170, file systems 180, and network interfaces 182 of another zone (non-global or global). In addition to enforcing the zone boundaries, kernel 150 also provides a number of other services. These services include but are not limited to mapping the network interfaces 182 of the non-global zones 140 to the physical network devices 120 of the computer system, and mapping the file systems 180 of the non-global zones 140 to an overall file system and a physical storage 110 of the computer system.

Non-Global Zone States

In one embodiment, a non-global zone 140 may take on one of four states: (1) Configured; (2) Installed; (3) Ready; and (4) Running. When a non-global zone 140 is in the Configured state, it means that an administrator in the global zone 130 has invoked an operating system utility (in one embodiment, zonecfg(1m)) to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone's file system 180, specification of one or more file systems to be mounted when the zone is created, specification of zero or more network interfaces, specification of devices to be configured when the zone is created, and zero or more resource pool associations.

Once a zone is in the Configured state, a global administrator may invoke another operating system utility (in one embodiment, zoneadm(1m)) to put the zone into the Installed state. When invoked, the operating system utility interacts with the kernel 150 to install all of the necessary files and directories into the zone's root directory, or a subdirectory thereof.

To put an Installed zone into the Ready state, a global administrator invokes an operating system utility (in one embodiment, zoneadm(1m) again), which a zoneadmd process 162 causes to be started (there is a zoneadmd process associated with each non-global zone). In one embodiment, zoneadmd 162 runs within the global zone 130 and is responsible for managing its associated non-global zone 140. After zoneadmd 162 is started, it interacts with the kernel 150 to establish the non-global zone 140. In creating a non-global zone 140, a number of operations are performed, including but not limited to assigning a zone ID, starting a zsched process 164 (zsched is a kernel process; however, it runs within the non-global zone 140, and is used to track kernel resources associated with the non-global zone 140), mounting file systems 180, plumbing network interfaces 182, configuring devices, and setting resource controls. These and other operations put the non-global zone 140 into the Ready state to prepare it for normal operation.

Putting a non-global zone 140 into the Ready state gives rise to a virtual platform on which one or more processes may be executed. This virtual platform provides the infrastructure necessary for enabling one or more processes to be executed within the non-global zone 140 in isolation from processes in other non-global zones 140. The virtual platform also makes it possible to isolate other entities such as file system 180 and network interfaces 182 within the non-global zone 140, so that the zone behaves like a virtual standalone computer. When a non-global zone 140 is in the Ready state, no user or non-kernel processes are executing inside the zone (as is mentioned above, zsched is a kernel process, not a user process). Thus, the virtual platform provided by the non-global zone 140 is independent of any processes executing within the zone. Put another way, the zone and hence, the virtual platform, exists even if no user or non-kernel processes are executing within the zone. This means that a non-global zone 140 can remain in existence from the time it is created until either the zone or the OS is terminated. The life of a non-global zone 140 need not be limited to the duration of any user or non-kernel process executing within the zone.

After a non-global zone 140 is in the Ready state, it can be transitioned into the Running state by executing one or more user processes in the zone. In one embodiment, this is done by having zoneadmd 162 start an init process 172 in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes 170 are confined to the non-global zone 140; thus, they cannot access or affect processes, file systems, or network interfaces in other zones. The application environment exists so long as one or more user processes are executing within the non-global zone 140.

After a non-global zone 140 is in the Running state, its associated zoneadmd 162 can be used to manage it. Zoneadmd 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by zoneadmd 162 to manage a non-global zone 140 on an ongoing basis during regular operation.

Overview of Virtualized System Statistics

Figure 2A:
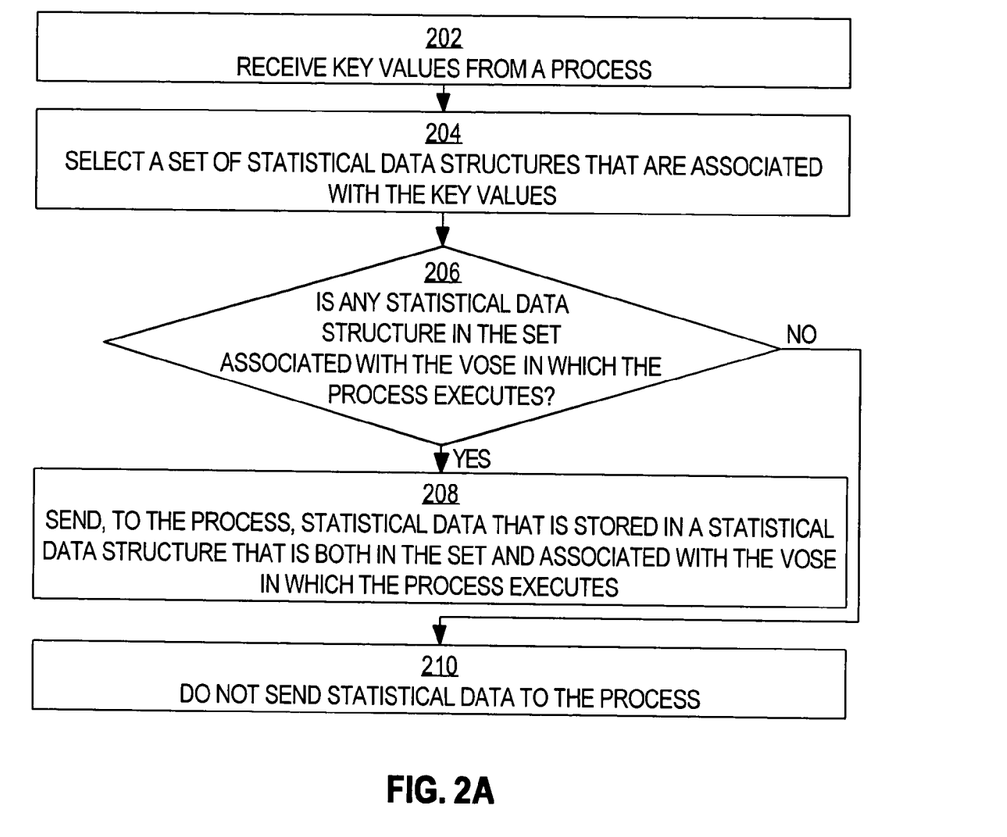
FIG. 2A depicts an overview of an operational flow for virtualizing system statistics in an OSE that has been partitioned into a global zone and one or more non-global zones, in accordance with one embodiment of the present invention.

FIG. 2A depicts an overview of an operational flow for virtualizing system statistics in an OSE that has been partitioned into a global zone and one or more non-global zones, in accordance with one embodiment of the present invention. In block 202, one or more key values are received from a process that executes in one of a plurality of VOSEs (i.e., non-global zones 140). In block 204, a set of one or more statistical data structures that are associated with the one or more key values are selected from among a plurality of statistical data structures. In block 206, it is determined whether any statistical data structure in the set of one or more statistical data structures is associated with the VOSE in which the process executes. If so, then control passes to block 208. If not, then control passes to block 210.

In block 208, statistical data that is stored in a statistical data structure that is both in the set and associated with the VOSE in which the process executes is sent to the process. Alternatively, in block 210, no statistical data that is stored in statistical data structures in the set is sent to the process. Thus, even if multiple statistical data structures (each associated with a different non-global zone) are associated with the same key values, a process may, by specifying the key values, obtain statistical data from the one of the multiple statistical data structures that is associated with the process' associated non-global zone (if that statistical data structure exists). The process does not need to specify, or even be aware of, the non-global zone in which the process executes. Furthermore, no user or mechanism needs to ensure that key values associated with a particular non-global zone's associated statistical data structures are not also associated with other non-global zones' associated statistical data structures.

Figure 2B:
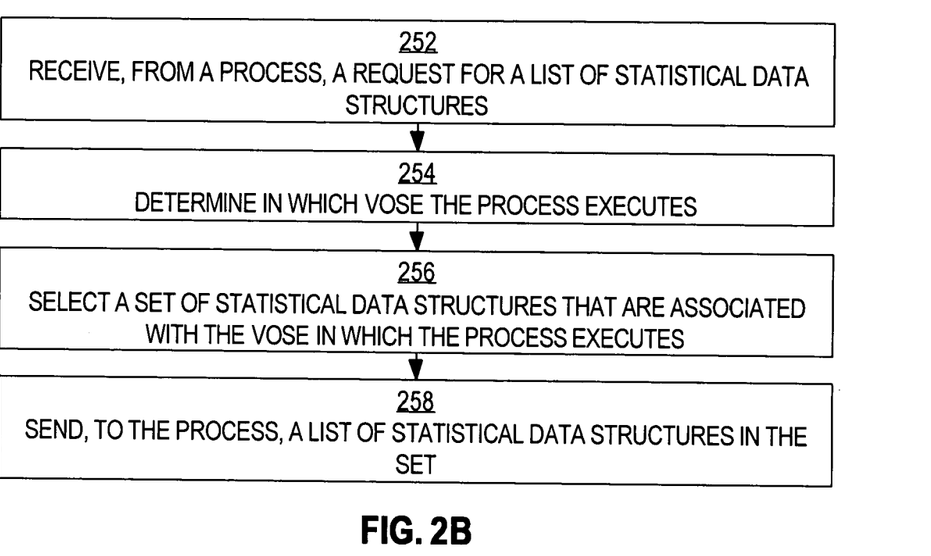
FIG. 2B depicts an overview of an operational flow for constructing a virtualized list of statistical data structures in an OSE that has been partitioned into a global zone and one or more non-global zones, in accordance with one embodiment of the present invention.

FIG. 2B depicts an overview of an operational flow for constructing a virtualized list of statistical data structures in an OSE that has been partitioned into a global zone and one or more non-global zones, in accordance with one embodiment of the present invention. In block 252, a request for a list of statistical data structures is received from a process that executes in one of a plurality of VOSEs (i.e., non-global zones 140). In block 254, it is determined in which VOSE of the plurality of VOSEs the process executes. In block 256, a set of one or more statistical data structures that are associated with the VOSE in which the process executes are selected from among the plurality of statistical data structures. In block 258, a list of statistical data structures in the set of one or more statistical data structures is sent to the process. Thus, processes executing in a particular non-global zone may, without specifying the non-global zone in which those processes execute, obtain a list that contains only statistical data structures that are associated with the particular non-global zone. This enables processes to interact with the partitioned OSE's system statistics reporting mechanisms in the same manner that the processes would interact with a non-partitioned OSE's system statistics reporting mechanisms.

Process/Zone Associations

In one embodiment, when an application program is executed within a zone, an application process is started as a child process of a process executing within that zone. Because each child process is associated with the zone with which that child process' parent process is associated, the application process is associated with the zone in which it was executed. For example, if a zone administrator for non-global zone 140*a* executes an application program, then, in non-global zone 140*a*, an application process is started as a child process of a process executing in non-global zone 140*a*. Because the parent process of the utility process is associated with non-global zone 140*a*, the application process also is associated with non-global zone 140*a*. Similarly, if a zone administrator for global zone 130 executes an application program then, in global zone 130, an application process will be started and associated with global zone 130.

Each zone is associated with a different zone identifier. Associating a process with a zone may be accomplished, for example, by storing an association between the process' unique process identifier and the zone's unique zone identifier.

Virtualized System Statistics

A partitioned OSE should allow users and processes that are associated with a particular non-global zone to access system statistics that pertain specifically to the use of system resources by users and processes associated with the particular non-global zone. However, except for users and processes that are associated with the global zone, users and processes that are not associated with the particular non-global zone should be prevented from accessing system statistics that pertain only to the use of system resources by users and processes that are associated with the particular non-global zone. Otherwise, system security could be compromised.

Additionally, in a partitioned OSE, users and processes that are associated with a particular non-global zone typically have little use for system statistics that do not specifically pertain to the use of system resources by users and processes associated with the particular non-global zone. For example, an administrator of non-global zone 140*a* might find system statistics that detail the use of system resources by users and processes associated with non-global zone 140*a* to be much more useful than system statistics that consist solely of a non-zone-specific summary of the use of system resources generally.

Therefore, in one embodiment, a mechanism for maintaining separate zone-specific system statistics for each zone is provided. In one embodiment, kernel 150 maintains a separate statistical data structure, referred to herein as a "k-stat," for each system resource that is defined within OSE 100. For example, system resources may include NFS mounts and central processing units (CPUs). A k-stat for a particular resource contains statistical data that pertains to the particular resource. For example, a k-stat for a particular NFS mount might contain information about how much information has been written to the particular NFS mount. For another example, a k-stat for a particular CPU might contain information about the percentage of time that the particular CPU has been idle.

In one embodiment, kernel 150 contains multiple modules, also referred to as subsystems. For example, kernel 150 might contain a remote procedure call ("RPC") module and an NFS module. In one embodiment, each system resource is associated with a module. Different system resources may be associated with different modules. In one embodiment, a module creates a separate k-stat for each system resource with which that module is associated. For each such k-stat, the module may establish an association between that k-stat and the global OSE (i.e., global zone 130) and/or one or more VOSEs (i.e., non-global zones 140) within the global OSE. Different k-stats may be associated with different zones.

For example, a process executing in non-global zone 140*a* may send, to kernel 150, a request to mount an NFS file system. In response to receiving the request from the process, kernel 150 may forward the request to an NFS module. In response to receiving the request from kernel 150, the NFS module may mount the NFS file system, thereby generating an NFS mount. In connection with mounting the NFS file system, the NFS module may generate a k-stat for the NFS mount, and establish an association between the k-stat and the NFS mount. The NFS module may determine in which of non-global zones 140 the process executes. In response to determining that the process executes in non-global zone 140*a*, the NFS module may establish an association between the NFS mount's k-stat and non-global zone 140*a*. The NFS module also may establish an association between the NFS mount's k-stat and global zone 130.

For another example, a particular module may generate a separate k-stat for each CPU in a plurality of CPUs. For each such CPU, the particular module may associate that CPU with any of a plurality of resource pools. Each such resource pool may comprise, for example, CPU resources, memory resources, and/or other resources of OSE 100. A process executing in global zone 130 may send, to kernel 150, a request to bind non-global zone 140*b* with a particular resource pool. In response to receiving the request from the process, kernel 150 may forward the request to the particular module. In response to receiving the request from kernel 150, the particular module may establish a binding between the particular resource pool and the specified non-global zone (in this example, non-global zone 140*b*). In connection with establishing the binding, the particular module may establish, for each CPU in the particular resource pool, an association between that CPU's k-stat and non-global zone 140*b*. The particular module also may establish an association between each such CPU's k-stat and global zone 130. A process executing in a particular non-global zone will only "see" k-stats for CPUs in the resource pools to which the particular non-global zone is bound.

As a result, the k-stats of different system resources may be associated with different zones. Each k-stat may be associated with one or more zones. For example, if both non-global zone 140*a* and non-global zone 140*b* are bound to a particular resource pool, then the k-stats of the CPUs in the particular resource pool may be associated with both non-global zone 140*a* and non-global zone 140*b*. In one embodiment, either periodically or in response to the occurrence of an event relative to a system resource, kernel 150 adds to or updates statistical information pertaining to that system resource in that system resource's associated k-stat.

In one embodiment, when a process requests a list of k-stats, kernel 150 determines the zone in which the process executes. Kernel 150 selects, from among a plurality of k-stats, a set of k-stats that contains only those k-stats that are associated with the process' zone. Kernel 150 returns, to the process, a list of the k-stats in the set.

In one embodiment, kernel 150 collectively exports all k-stats as a device node from which processes can read statistical data. For example, in each zone, the device node may appear as though it were a file "/dev/kstat". When a process accesses the device node, the process may specify information that identifies a particular k-stat. In one embodiment, each k-stat is associated with a name, an instance, and a module. Thus, a process may specify a name, an instance, and a module to identify a k-stat. According to one embodiment, multiple k-stats may be associated with the same name, instance, and module, as long as each of those k-stats is associated with a different zone.

In one embodiment, when a process accesses the device node to read statistical data from a particular k-stat, the process specifies a name, instance, and module. Kernel 150 determines in which zone the process is executing. Kernel 150 selects, from among a plurality of k-stats, only those k-stats that are associated with the process-specified name, instance, and module (as is mentioned above, k-stats in different zones might be associated with the same name, instance, and module). Kernel 150 determines whether any k-stat in the selected statistical data structures is associated with the zone identifier of the zone in which the process is executing. If kernel 150 determines that such a k-stat exists in the selected statistical data structures, then kernel 150 returns, to the process, statistical information that is stored in the k-stat. If no such k-stat exists in the selected statistical data structures, then kernel 150 does not return any statistical information to the process. As a result, processes may obtain statistical information that pertains specifically to zones in which those processes execute. Additionally, processes are prevented from obtaining statistical information that pertains only to zones to which those processes do not have access.

According to one embodiment, statistical information that is stored in a k-stat may include an identity of a mount, and/or a quantity of data read from and/or written to the mount by a process. According to one embodiment, statistical information that is stored in a k-stat may include an identity of a CPU, and/or an amount of the CPU's time used by all processes.

In one embodiment, by associating a k-stat with global zone 130 in addition to any non-global zones 140 with which that k-stat is associated, users and processes associated with global zone 130 may obtain statistical information concerning the use of system resources by users and processes associated with multiple zones in OSE 100. In one embodiment, by associating selected k-stats only with global zone 130, users and processes that are associated only with non-global zones 140 are prevented from accessing (and spared from being inundated by) statistical information stored in those selected k-stats.

Sample Operation

With the above information in mind, a sample of operation of system 100 in accordance with one embodiment of the present invention will now be described. In the following discussion, reference will be made to the system diagram of FIG. 1 and the flow diagrams of FIG. 3A and FIG. 3B.

Figure 3A:
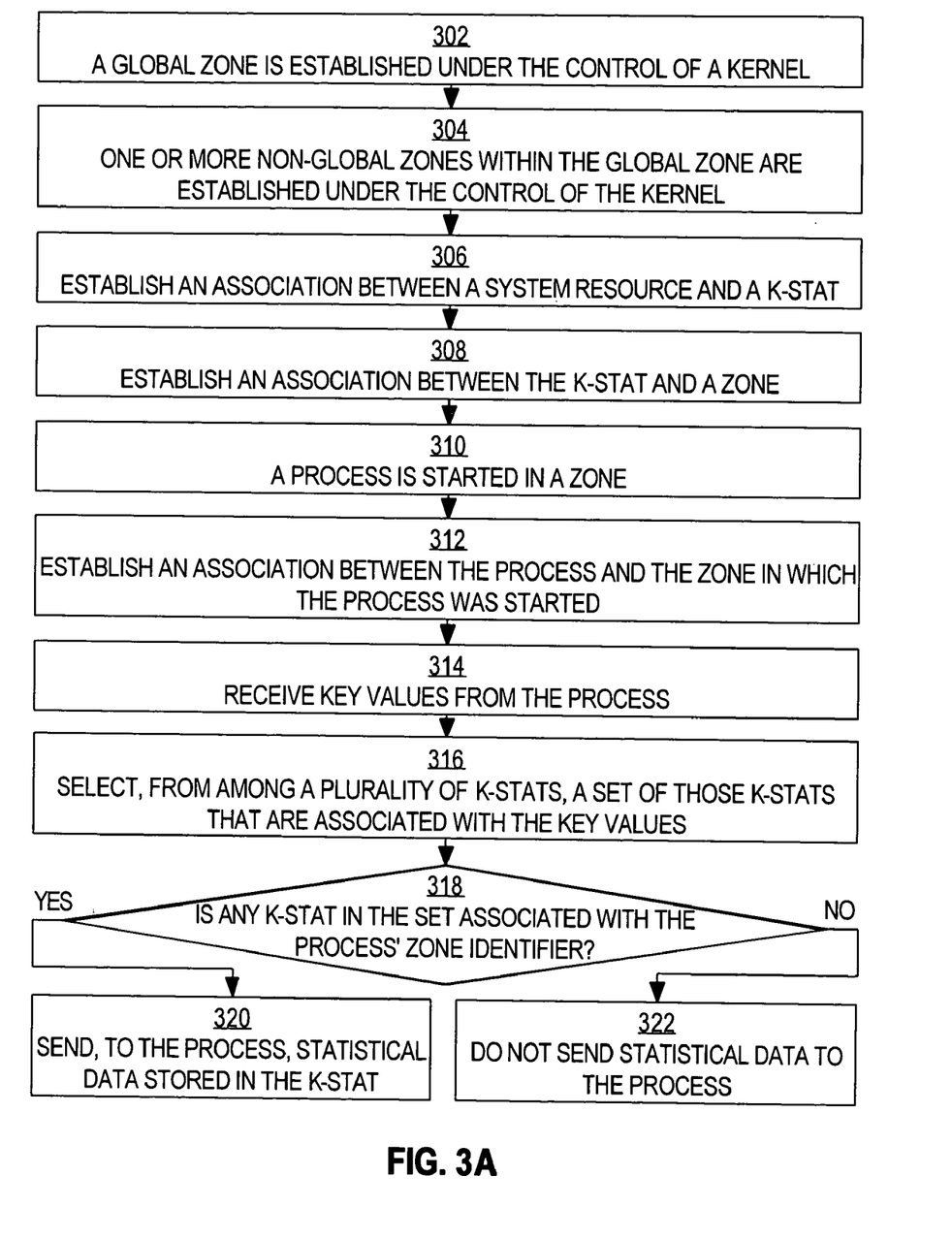
FIG. 3A depicts an operational flow for virtualizing system statistics in an OSE that has been partitioned into a global zone and one or more non-global zones, in accordance with one embodiment of the present invention.

FIG. 3A depicts an operational flow for virtualizing system statistics in an OSE that has been partitioned into a global zone and one or more non-global zones, in accordance with one embodiment of the present invention. Although FIG. 3A depicts operations being performed in a particular order, operations such as those depicted may, in various different embodiments, be performed in various different orders.

In block 302, a global zone is established under the control of a kernel. For example, global zone 130 may be established under the control of kernel 150. In block 304, one or more non-global zones, under the control of the kernel, are established within the global zone. For example, non-global zones 140 may be established within global zone 130. Thus, the global zone and the one or more non-global zones are established within the same OSE, rather than separate OSEs having separate kernels.

In block 306, an association is established between a system resource and a k-stat. For example, kernel 150 may establish an association between an NFS mount and a k-stat that corresponds specifically to the NFS mount. Given a plurality of system resources, each such system resource may be associated with a different k-stat of a plurality of k-stats. In one embodiment, each such k-stat may be associated with a name, an instance, and a module. Although reference is made to the establishment of a single association between a single system resource and a single k-stat, many of such associations may be established, and each such association may be between a different system resource and a different k-stat. In block 308, an association is established between the k-stat and a zone. For example, kernel 150 may establish an association between an NFS mount's associated k-stat and the zone in which the NFS mount was initiated. Although reference is made to the establishment of a single association between a single k-stat and a single zone, many of such associations may be established, and each such association may be between a different k-stat and a different zone.

In block 310, a process is started in a zone. For example, a process may be started in non-global zone 140*a*. In block 312, in response to the starting of the process, an association is established between the process and the zone in which the process was started. For example, kernel 150 may establish an association between non-global zone 140*a* and a process that was started in non-global zone 140*a*. Given a plurality of processes, each such process may be associated with global zone 130 or any one of non-global zones 140.

In block 314, one or more key values are received from the process. For example, kernel 150 may receive, from a process executing in non-global zone 140*a*, key values that indicate a name, an instance, and a module. In block 316, from a plurality of k-stats, only those k-stats that are associated with the one or more process-specified key values are selected to be in a set of k-stats. For example, if the name, instance, and module is "foo, 0, foo," then kernel 150 selects, from all k-stats, a set of k-stats that are associated with "foo, 0, foo"; such k-stats may be associated with various different zones.

In block 318, it is determined whether any k-stat in the selected set of k-stats is associated with the zone identifier of the zone in which the process executes. For example, kernel 150 may determine whether any k-stat in the selected set of k-stats is associated with non-global zone 140*a*, in which the process executes. If a particular k-stat in the selected set is associated with the process' associated zone identifier, then control passes to block 320. Otherwise, control passes to block 322.

In block 320, statistical data stored in the particular k-stat is sent to the process. For example, kernel 150 may send, to a process executing in non-global zone 140*a*, statistical information that is stored in a k-stat that is associated with (a) the process-specified name, instance, module tuple and (b) non-global zone 140*a*. The statistical information might indicate, for example, a quantity of data that has been written to an NFS mount that is associated with the k-stat.

Alternatively, in block 322, no statistical data is sent to the process.

Figure 3B:
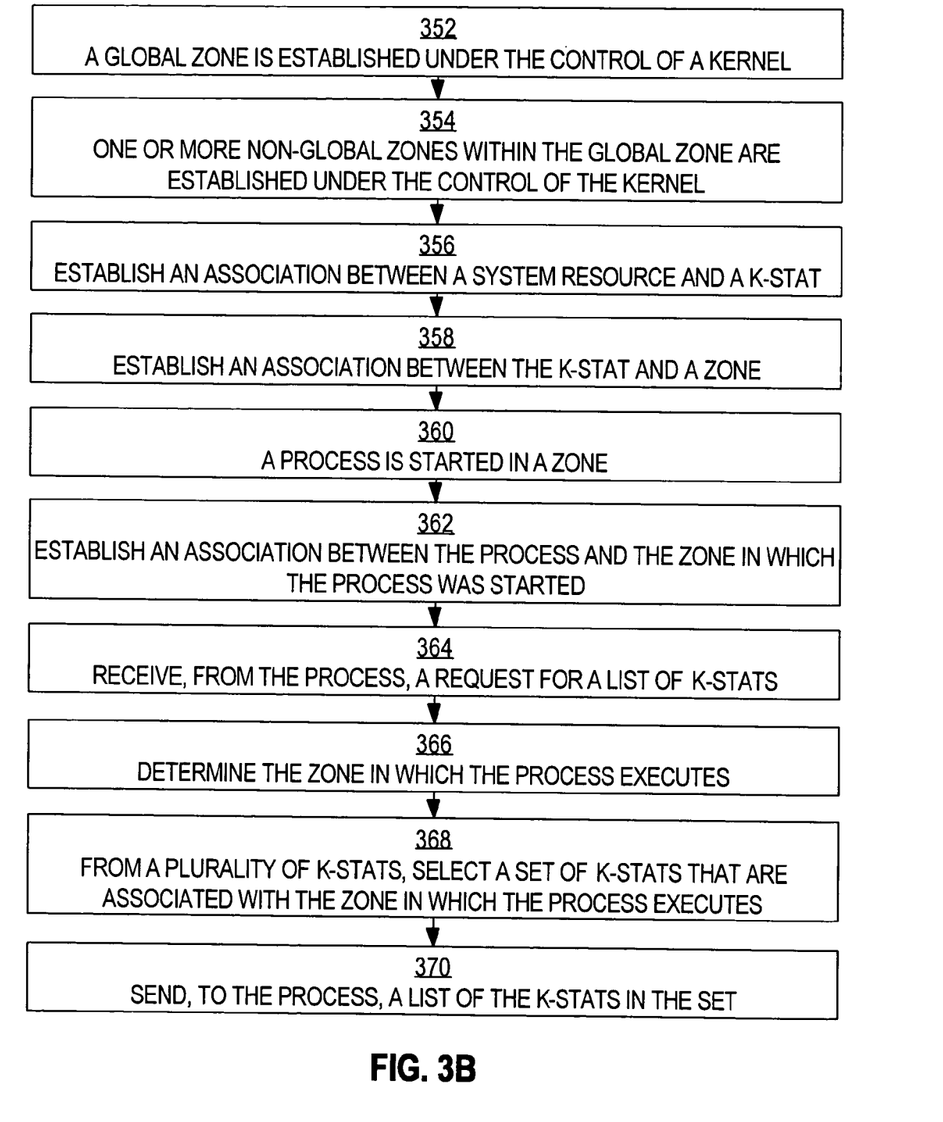
FIG. 3B depicts an operational flow for constructing a virtualized list of statistical data structures in an OSE that has been partitioned into a global zone and one or more non-global zones, in accordance with one embodiment of the present invention.

FIG. 3B depicts an operational flow for constructing a virtualized list of statistical data structures in an OSE that has been partitioned into a global zone and one or more non-global zones, in accordance with one embodiment of the present invention. Although FIG. 3B depicts operations being performed in a particular order, operations such as those depicted may, in various different embodiments, be performed in various different orders.

In block 352, a global zone is established under the control of a kernel. For example, global zone 130 may be established under the control of kernel 150. In block 354, one or more non-global zones, under the control of the kernel, are established within the global zone. For example, non-global zones 140 may be established within global zone 130. Thus, the global zone and the one or more non-global zones are established within the same OSE, rather than separate OSEs having separate kernels.

In block 356, an association is established between a system resource and a k-stat. For example, kernel 150 may establish an association between an NFS mount and a k-stat that corresponds specifically to the NFS mount. Although reference is made to the establishment of a single association between a single system resource and a single k-stat, many of such associations may be established, and each such association may be between a different system resource and a different k-stat. In block 358, an association is established between the k-stat and a zone. For example, kernel 150 may establish an association between an NFS mount's associated k-stat and the zone in which the NFS mount was initiated. Although reference is made to the establishment of a single association between a single k-stat and a single zone, many of such associations may be established, and each such association may be between a different k-stat and a different zone.

In block 360, a process is started in a zone. For example, a process may be started in non-global zone 140a. In block 362, in response to the starting of the process, an association is established between the process and the zone in which the process was started. For example, kernel 150 may establish an association between non-global zone 140a and a process that was started in non-global zone 140a. Given a plurality of processes, each such process may be associated with global zone 130 or any one of non-global zones 140.

In block 364, a request for a list of k-stats is received from the process. For example, kernel 150 may receive, from a process executing in non-global zone 140a, a request for a list of k-stats. In block 366, the zone in which the process executes is determined. For example, from a zone identifier that was associated with a process in conjunction with the starting of the process, kernel 150 may determine that the process executes in non-global zone 140a.

In block 368, from a plurality of k-stats, only those k-stats that are associated with the zone identifier of the zone in which the process executes are selected to be in a set of k-stats. For example, if the process executes in non-global zone 140a, then only those k-stats that also are associated with the zone identifier of non-global zone 140a are selected to be in the set. In block 370, a list of the k-stats in the selected set is sent to the process. For example, kernel 150 may send, to a process executing in non-global zone 140a, a list of k-stats that includes only k-stats that are associated with non-global zone 140a, and all of such k-stats. The list may identify the k-stats without revealing the contents of those k-stats.

Hardware Overview

In one embodiment, the various components of computing environment 100 shown in FIG. 1 can be implemented as sets of instructions executable by one or more processors. These components may be implemented as part of an operating system, including but not limited to the Solaris™ operating system produced by Sun Microsystems, Inc. FIG. 4 is a block diagram that illustrates a computer system 400 upon which an embodiment of the invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may also be a medium (e.g. air) that enables signals to be capacitively exchanged between one or more of the components. Bus 402 may further be a network connection that connects one or more of the components. Overall, any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. In this instance, the bus 402 would be the medium (such as air) that enables this capacitive communication to take place. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
    receiving one or more key values from a first process that executes in a first virtual operating system environment (VOSE) of a plurality of VOSEs controlled by a single operating system kernel instance;
    selecting, from a plurality of statistical data structures, one or more statistical data structures that are each identified by the one or more key values;
    determining whether any statistical data structure of the one or more statistical data structures is associated with the first VOSE, in which the first process executes; and
    if a particular statistical data structure of the one or more statistical data structures is associated with the first VOSE, then sending, to the first process, statistical data that is stored in the particular statistical data structure that is associated with the first VOSE;
    wherein the statistical data that is sent to the first process comprises statistics that indicate information about prior usage of a specific system resource with which the particular statistical data structure is associated.

2. The method of claim 1, further comprising:
    if no statistical data structure of the one or more statistical data structures is associated with a VOSE in which the first process executes, then preventing statistical data that is stored in any of the one or more statistical data structures from being sent to the first process.

3. The method of claim 1, further comprising:
receiving, from a second process, a request to mount a file system;
in response to receiving the request, performing steps comprising:
  mounting the file system, thereby producing a mount;
  establishing an association between the mount and the particular statistical data structure;
  determining in which VOSE of the plurality of VOSEs the second process executes; and
  establishing an association between the particular statistical data structure and a VOSE in which the second process executes.

4. The method of claim 1, further comprising:
establishing an association between a central processing unit (CPU) and the particular statistical data structure;
establishing an association between the CPU and a resource pool;
receiving, from a second process, a request to bind a particular VOSE to the resource pool; and
in response to receiving the request, establishing an association between the particular statistical data structure and the particular VOSE.

5. The method of claim 1, further comprising:
receiving the one or more key values from a second process that executes in a global operating system environment (OSE) that comprises the plurality of VOSEs;
determining whether any statistical data structure of the one or more statistical data structures is associated with the global OSE; and
if the particular statistical data structure is associated with the global OSE, then sending, to the second process, statistical data that is stored in the particular statistical data structure.

6. The method of claim 1, further comprising:
receiving the one or more key values from a second process that executes in a second VOSE of the plurality of VOSEs;
determining whether any statistical data structure of the one or more statistical data structures is associated with a VOSE in which the second process executes; and
if the particular statistical data structure is associated with a VOSE in which the second process executes, then sending, to the second process, statistical data that is stored in the particular statistical data structure;
wherein the second process is separate from the first process; and
wherein the second VOSE is separate from the first VOSE.

7. The method of claim 1, further comprising:
receiving a request to create a second VOSE within the plurality of VOSEs;
in response to receiving the request to the create the second VOSE, creating a second statistical data structure; and
establishing an association between the second statistical data structure and a first set of key values that typically are associated with a statistical data structure in a non-partitioned OSE;
wherein all statistical data requests that are (a) received by processes executing within the second VOSE and (b) for statistical data that is associated with the first set of key values cause the operating system kernel instance to return statistical data that pertains only to the second VOSE.

8. The method of claim 7, further comprising:
receiving a request to create a third VOSE within the plurality of VOSEs;
in response to receiving the request to create the third VOSE, creating a third statistical data structure; and
establishing an association between the third statistical data structure and a third set of key values that typically are associated with a statistical data structure in a non-partitioned OSE;
wherein all statistical data requests that are (a) received by processes executing within the third VOSE and (b) for statistical data that is associated with the second set of key values cause the operating system kernel instance to return statistical data that pertains only to the third VOSE;
wherein the third VOSE is separate from the second VOSE; and
wherein the third statistical data structure is separate from the second statistical data structure.

9. A machine-implemented method, comprising:
receiving, from a process that executes in a first virtual operating system environment (VOSE) of a plurality of VOSEs controlled by a single operating system kernel instance, a request for a list of statistical data structures;
determining in which VOSE of the plurality of VOSEs the process executes;
selecting, from a plurality of statistical data structures, a set of one or more statistical data structures that are associated with a VOSE in which the process executes; and
sending, to the process, a list of statistical data structures that are in the set of one or more statistical data structures.

10. A machine-readable medium, comprising:
instructions for causing one or more processors to receive one or more key values from a first process that executes in a first virtual operating system environment (VOSE) of a plurality of VOSEs controlled by a single operating system kernel instance;
instructions for causing one or more processors to select, from a plurality of statistical data structures, one or more statistical data structures that are each identified by the one or more key values;
instructions for causing one or more processors to determine whether any statistical data structure of the one or more statistical data structures is associated with the first VOSE, in which the first process executes; and
instructions for causing one or more processors to send, to the first process, statistical data that is stored in a particular statistical data structure of the one or more statistical data structures, if the particular statistical data structure is associated with the first VOSE;
wherein the statistical data that is sent to the first process comprises statistics that indicate information about prior usage of a specific system resource with which the particular statistical data structure is associated.

11. The machine-readable medium of claim 10, further comprising:
instructions for causing one or more processors to prevent statistical data that is stored in any of the one or more statistical data structures from being sent to the first process if no statistical data structure of the one or more statistical data structure is associated with a VOSE in which the first process executes.

12. The machine-readable medium of claim 10, further comprising:
instructions for causing one or more processors to receive, from a second process, a request to mount a file system;
instructions for causing one or more processors to execute, in response to receiving the request, instructions comprising:
instructions for causing one or more processors to mount the file system, thereby producing a mount;
instructions for causing one or more processors to establish an association between the mount and the particular statistical data structure;
instructions for causing one or more processors to determine in which VOSE of the plurality of VOSEs the second process executes; and
instructions for causing one or more processors to establish an association between the particular statistical data structure and a VOSE in which the second process executes.

13. The machine-readable medium of claim 10, further comprising:
instructions for causing one or more processors to establish an association between a central processing unit (CPU) and the particular statistical data structure;
instructions for causing one or more processors to establish an association between the CPU and a resource pool;
instructions for causing one or more processors to receive, from a second process, a request to bind a particular VOSE to the resource pool; and
instructions for causing one or more processors to establish an association between the particular statistical data structure and the particular VOSE.

14. The machine-readable medium of claim 10, further comprising:
instructions for causing one or more processors to receive the one or more key values from a second process that executes in a global operating system environment (OSE) that comprises the plurality of VOSEs;
instructions for causing one or more processors to determine whether any statistical data structure of the one or more statistical data structures is associated with the global OSE; and
instructions for causing one or more processors to send, to the second process, statistical data that is stored in the particular statistical data structure, if the particular statistical data structure is associated with the global OSE.

15. The machine-readable medium of claim 10, further comprising:
instructions for causing one or more processors to receive the one or more key values from a second process that executes in a second VOSE of the plurality of VOSEs;
instructions for causing one or more processors to determine whether any statistical data structure of the in the set of one or more statistical data structures is associated with a VOSE in which the second process executes; and
instructions for causing one or more processors to send, to the second process, statistical data that is stored in the particular statistical data structure, if the particular statistical data structure is associated with a VOSE in which the second process executes;
wherein the second process is separate from the first process; and
wherein the second VOSE is separate from the first VOSE.

16. The machine-readable medium of claim 10, further comprising:
instructions for causing one or more processors to receive a request to create a second VOSE within the plurality of VOSEs;
instructions for causing one or more processors to create a second statistical data structure in response to receiving the request to create the second VOSE; and
instructions for causing one or more processors to establish an association between the second statistical data structure and a first set of key values that typically are associated with a statistical data structure in a non-partitioned OSE;
wherein all statistical data requests that are (a) received by processes executing within the second VOSE and (b) for statistical data that is associated with the first set of key values cause the operating system kernel instance to return statistical data that pertains only to the second VOSE.

17. The machine-readable medium of claim 16, further comprising:
instructions for causing one or more processors to receive a request to create a third VOSE within the plurality of VOSEs;
instructions for causing one or more processors to create a third statistical data structure in response to receiving the request to create the third VOSE; and
instructions for causing one or more processors to establish an association between the third statistical data structure and a third set of key values that typically are associated with a statistical data structure in a non-partitioned OSE;
wherein all statistical data requests that are (a) received by processes executing within the third VOSE and (b) for statistical data that is associated with the second set of key values cause the operating system kernel instance to return statistical data that pertains only to the third VOSE;
wherein the third VOSE is separate from the second VOSE; and
wherein the third statistical data structure is separate from the second statistical data structure.

18. A machine-readable medium, comprising:
instructions for causing one or more processors to receive, from a process that executes in a first virtual operating system environment (VOSE) of a plurality of VOSEs controlled by a single operating system kernel instance, a request for a list of statistical data structures;
instructions for causing one or more processors to determine in which VOSE of the plurality of VOSEs the process executes;
instructions for causing one or more processors to select, from a plurality of statistical data structures, a set of one or more statistical data structures that are associated with a VOSE in which the process executes; and
instructions for causing one or more processors to send, to the process, a list of statistical data structures that are in the set of one or more statistical data structures.

19. An apparatus, comprising:
a mechanism for receiving one or more key values from a first process that executes in a first virtual operating system environment (VOSE) of a plurality of VOSEs controlled by a single operating system kernel instance;
a mechanism for selecting, from a plurality of statistical data structures, one or more statistical data structures that are each identified by the one or more key values;

a mechanism for determining whether any statistical data structure of the one or more statistical data structures is associated with the first VOSE, in which the first process executes; and a mechanism for sending, to the first process, statistical data that is stored in a particular statistical data structure of the one or more statistical data structures, if the particular statistical data structure is associated with the first VOSE;

wherein the statistical data that is sent to the first process comprises statistics that indicate information about prior usage of a specific system resource with which the particular statistical data structure is associated.

20. The apparatus of claim 19, further comprising:

a mechanism for preventing statistical data that is stored in any of the one or more statistical data structures from being sent to the first process if no statistical data structure of the one or more statistical data structures is associated with a VOSE in which the first process executes.

21. The apparatus of claim 19, further comprising:

a mechanism for receiving, from a second process, a request to mount a file system;

a mechanism for performing, in response to receiving the request, steps comprising:
  mounting the file system, thereby producing a mount;
  establishing an association between the mount and the particular statistical data structure;
  determining in which VOSE of the plurality of VOSEs the second process executes; and
  establishing an association between the particular statistical data structure and a VOSE in which the second process executes.

22. The apparatus of claim 19, further comprising:

a mechanism for establishing an association between a central processing unit (CPU) and the particular statistical data structure;

a mechanism for establishing an association between the CPU and a resource pool;

a mechanism for receiving, from a second process, a request to bind a particular VOSE to the resource pool; and a mechanism for establishing an association between the particular statistical data structure and the particular VOSE.

23. The apparatus of claim 19, further comprising:

a mechanism for receiving the one or more key values from a second process that executes in a global operating system environment (OSE) that comprises the plurality of VOSEs;

a mechanism for determining whether any statistical data structure of the one or more statistical data structures is associated with the global OSE; and a mechanism for sending, to the second process, statistical data that is stored in the particular statistical data structure, if the particular statistical data structure is associated with the global OSE.

24. The apparatus of claim 19, further comprising:

a mechanism for receiving the one or more key values from a second process that executes in a second VOSE of the plurality of VOSEs;

a mechanism for determining whether any statistical data structure of the one or more statistical data structures is associated with a VOSE in which the second process executes; and a mechanism for sending, to the second process, statistical data that is stored in the particular statistical data structure, if the particular statistical data structure is associated with a VOSE in which the second process executes;

wherein the second process is separate from the first process; and wherein the second VOSE is separate from the first VOSE.

25. The apparatus of claim 19, further comprising:

a mechanism for receiving a request to create a second VOSE within the plurality of VOSEs;

a mechanism for creating a second statistical data structure in response to receiving the request to create the second VOSE; and a mechanism for establishing an association between the second statistical data structure and a first set of key values that typically are associated with a statistical data structure in a non-partitioned OSE;

wherein all statistical data requests that are (a) received by processes executing within the second VOSE and (b) for statistical data that is associated with the first set of key values cause the operating system kernel instance to return statistical data that pertains only to the second VOSE.

26. The apparatus of claim 25, further comprising:

a mechanism for receiving a request to create a third VOSE within the plurality of VOSEs;

a mechanism for creating a third statistical data structure in response to receiving the request to create the third VOSE; and a mechanism for establishing an association between the third statistical data structure and a third set of key values that typically are associated with a statistical data structure in a non-partitioned OSE;

wherein all statistical data requests that are (a) received by processes executing within the third VOSE and (b) for statistical data that is associated with the second set of key values cause the operating system kernel instance to return statistical data that pertains only to the third VOSE;

wherein the third VOSE is separate from the second VOSE; and wherein the third statistical data structure is separate from the second statistical data structure.

27. An apparatus, comprising:

a mechanism for receiving, from a process that executes in a first virtual operating system environment (VOSE) of a plurality of VOSEs controlled by a single operating system kernel instance, a request for a list of statistical data structures;

a mechanism for determining in which VOSE of the plurality of VOSEs the process executes;

a mechanism for selecting, from a plurality of statistical data structures, a set of one or more statistical data structures that are associated with a VOSE in which the process executes; and a mechanism for sending, to the process, a list of statistical data structures that are in the set of one or more statistical data structures.

* * * * *

UNITED STATES PATENT AND TRADEMARK OFFICE
CERTIFICATE OF CORRECTION

PATENT NO.        : 7,188,120 B1                                    Page 1 of 1
APPLICATION NO.   : 10/762066
DATED             : March 6, 2007
INVENTOR(S)       : Ozgur C. Leonard et al.

It is certified that error appears in the above-identified patent and that said Letters Patent is hereby corrected as shown below:

In the TITLE
(54) Replace "SYSTEM STATISTICS VIRTUALIZATION FOR OPERATING SYSTEMS PARTITIONS" with --SYSTEM STATISTICS VIRTUALIZATION FOR OPERATING SYSTEM PARTITIONS--

In the Other Publications
Page 2, Column 2, line 15, replace " http://www.solucorp.qc.ca/miscprj/s_content.he?pristate=1 " With --http://www.solucorp.qc.ca/miscprj/s_content.he?prjstate=1--

In the Claims
Claim 7, Column 15, line 57, after "request to" delete "the"

Claim 15, Column 17, line 55, delete "in the"

Claim 15, Column 17, line 56, delete "set of"

Signed and Sealed this

Tenth Day of July, 2007

JON W. DUDAS
*Director of the United States Patent and Trademark Office*